United States Patent [19]

Zink

[11] Patent Number: 4,535,199

[45] Date of Patent: Aug. 13, 1985

[54] DATA CALL TRANSFER PREINDICATION

[75] Inventor: John H. Zink, Manalapan, N.J.

[73] Assignee: AT&T Information Systems Inc., Holmdel, N.J.

[21] Appl. No.: 514,518

[22] Filed: Jul. 18, 1983

[51] Int. Cl.³ .................................. H04M 11/00
[52] U.S. Cl. ........................................... 179/2 DP
[58] Field of Search ............ 179/2 DP, 2 R, 2 A, 179/18 BD, 18 C, 99 M; 370/42, 53

[56] References Cited

U.S. PATENT DOCUMENTS 4,291,200 9/1981 Smith .......................... 179/2 DP X
4,330,886 5/1982 Fukuda et al. ................ 179/2 DP X

FOREIGN PATENT DOCUMENTS 56-8985 1/1981 Japan ............................. 179/2 DP
56-8986 1/1981 Japan ............................. 179/2 DP

*Primary Examiner*—Keith E. George
*Attorney, Agent, or Firm*—James M. Graziano

[57] ABSTRACT

The subject telephone switching provides for the redirection of established data calls to remotely located digital terminals and the reservation of these digital terminals at the time a data call is originated. In particular, a user can originate a data call from a telephone station set, reserve a selected digital terminal which may or may not be colocated with the telephone station set, and at some point in the call, transfer the established data call to the selected digital terminal by operating a data button on the calling telephone station set.

7 Claims, 5 Drawing Figures

DATA CALL TRANSFER PREINDICATION

CROSS-REFERENCE TO RELATED APPLICATIONS

This application is related to the following concurrently filed applications:

G. N. Squicciarini 1, Ser. No. 514,882, entitled "Digital Terminal Keyboard Dialing";

and J. H. Zink 1, Ser. No. 514,519, entitled "Data Call Transfer".

FIELD OF THE INVENTION

This invention relates to telephone switching systems and, in particular, to an arrangement for determining whether the switching system facilities necessary to complete a data call are available for use at the time the data call is originated as well as reserving these facilities for the exclusive use of the calling party prior to call completion.

BACKGROUND OF THE INVENTION

In prior art telephone switching systems, a user must originate a data call from a telephone station set and can only transfer this data call to an associated digital terminal which is connected to the same communication pair as the telephone station set. Redirecting the data call to a remotely located digital terminal is not possible nor is the reserving of a remotely-located idle digital terminal for use on the data call prior to completing the data call.

DESCRIPTION OF THE INVENTION

The subject telephone switching system provides for the redirection of established data calls to remotely located digital terminals and the reservation of these digital terminals at the time a data call is originated. In particular, a user can originate a data call from a telephone station set, reserve a selected digital terminal which may or may not be co-located with the telephone station set, and at some point in the call, transfer the established data call to the selected digital terminal.

This digital facilities reservation and data call redirection function is accomplished by the calling party pressing a data button on the calling telephone station set during dial tone, which button is associated with the selected digital terminal. The subject telephone switching system responds to the DATA button operation during dial tone by determining the busy/idle status of the selected digital terminal. If the selected digital terminal is idle, the system processor reserves the selected digital terminal and all switching system resources necessary to complete the data call transfer for the exclusive use of the calling party. The telephone switching system also transmits a confirmation tone to the calling party to indicate that the necessary facilities have been reserved.

When the calling party dials the number of the called station, the system processor activates the switching network which establishes a network connection between the calling party to the called station. The calling party can redirect this data call from the originating telephone station set to the selected (and now reserved) digital terminal by again pressing the DATA button on the telephone station set, which button is associated with the selected and reserved digital terminal. The system processor responds to this second operation of the DATA button by activating the switching network which substitutes the reserved digital terminal for the calling party on the network connection.

BRIEF DESCRIPTION OF THE DRAWING

FIG. 5 illustrates the data transmission format used between digital terminals and port circuits.

DETAILED DESCRIPTION OF THE DRAWINGS

Figure 1:
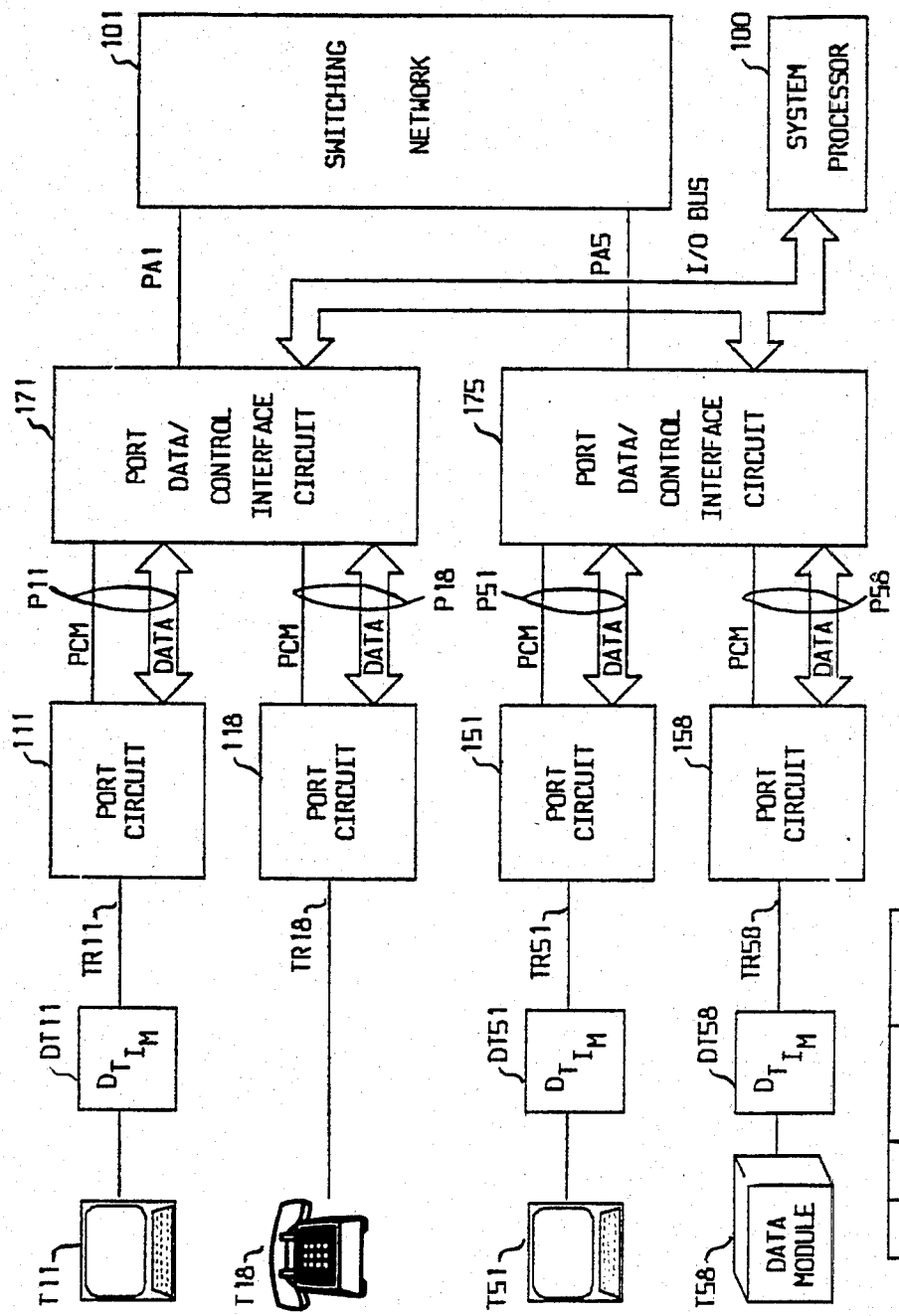
FIG. 1 illustrates the subject telephone switching system.

The subject telephone switching system is illustrated in block diagram form in FIG. 1. This system is described in detail in copending application Ser. No. 417,504, filed Sept. 13, 1982, by J. A. Lucas. This system includes a plurality of communications circuits T11-T58 each of which is associated with a respective one of port circuits 111-158. These communications circuits may include digital telephone station sets (T18) as well as digital terminal devices (T11) which are equipped with a keyboard and a CRT. A port circuit (such as 111 of FIG. 1) interfaces between alternate bipolar modulated code messages used by communications circuits T11-T58 and either pulse code modulated (PCM) data or PCM-encoded voice signals transmitted by switching network 101 between the calling and called stations. Port circuit 111 forwards control messages between system processor 100 via port data/control interface circuit 171 and digital terminal device T11.

Switching network 101 comprises a time slot interchange circuit of the type illustrated in U.S. Pat. No. 4,112,258. Switching network 101 is connected to a number of port data/control interface circuits 171-175, each of which serves as a multiplexer for a plurality of port circuits 111-158 and their associated communications circuits (T11-T58). Thus, switching network 101 establishes communication connections among port circuits 111-158 via the associated port data/control interface circuits 171-175.

This switching system is equipped with a control signalling channel (S channel) which conveys control messages between system processor 100 and communications circuits T11-T58. The S channel extends from each communication circuit (such as T18) through communication leads TR18, port circuit 118, leads P18 and then through port data/control interface circuit 171 to system processor 100 via I/O BUS. The switching system is also equipped with an information channel (I channel) which conveys information data such as PCM-encoded voice signals or bulk data between switching network 101 and communications circuits T11-T58. The I channel extends from each communications circuit (such as T18) through communication leads TR18, port circuit 118, leads P18 and then through port data/control interface circuit 171 to switching network 101 via leads PA1.

I Channel Realization

System processor 100, in the course of connecting calling digital telephone station set T18 to a called digital terminal such as data module (computer port) T58, assigns a time slot in switching network 101 for the interconnection of digital terminals T18 and T58.

Switching network 101 controls the data or I channel transmissions from communication circuits T11–T58. In particular, switching network 101 periodically transmits a message frame to port circuit 118 via port data/control interface circuit 171. Port circuit 118 transmits the message frame to digital telephone station set T18 and also receives a reply message frame from digital telephone station set T18 for transmission to data module T58. Port circuit 118 transmits the message frame received from digital telephone station set T18 to switching network 101 via port data/control interface circuit 171. Switching network 101 stores the received message frame, and interchanges the message frames received from digital telephone station set T18 and data module T58 during the time slot assigned for this call. This action interconnects these digital terminals.

S Channel Realization

The control or S channel transmissions are controlled by system processor 100. System processor 100 periodically scans each port, trunk and service circuit connected to switching network 101 to find if there is a control message for system processor 100. During each such scan cycle, system processor 100 transmits timing, address and control information to port data/control interface circuits 171–175 via I/O BUS. Each port data/control interface circuit (ex. 171) is a multiplexer which interprets the signals received on I/O BUS during each scan cycle and determines whether the address signals transmitted thereon identify one of the port circuits (e.g. 118) served by that port data/control interface circuit (171). If such a match occurs during a scan cycle, port data/control interface circuit 171 enables the identified port circuit 118 to read the control message transmitted to port data/control interface circuit 171 by system processor 100.

Port circuit 118 reads the control message written into port/data control interface circuit 171 by system processor 100 and places the control message into a control message register (not shown) in port circuit 118. Port circuit 118 transmits this control message one bit at a time from the control message register to telephone station set T18. Digital telephone station set T18 responds to these commands by performing the indicated operation, such as lighting a lamp, producing an audible ring signal, etc.

If digital telephone station set T18 has no reply or other control message to send back to system processor 100, it transmits idle bits back to port circuit 118. If digital telephone station set T18 has a control message to send to system processor 100, it is written into the control message register of port circuit 118 one bit at a time. Port circuit 118 sets a data-ready bit in its status register (not shown) to indicate to system processor 100 that a control message has arrived from digital telephone station set T18. System processor 100 periodically scans the port circuit status registers via I/O BUS and port data/control circuit 171 for a set data-ready bit. When one is found in port circuit 118, system processor 100 reads the control message stored in the control message register of port circuit 118 and resets the data-ready bit in the status register.

Figure 2:
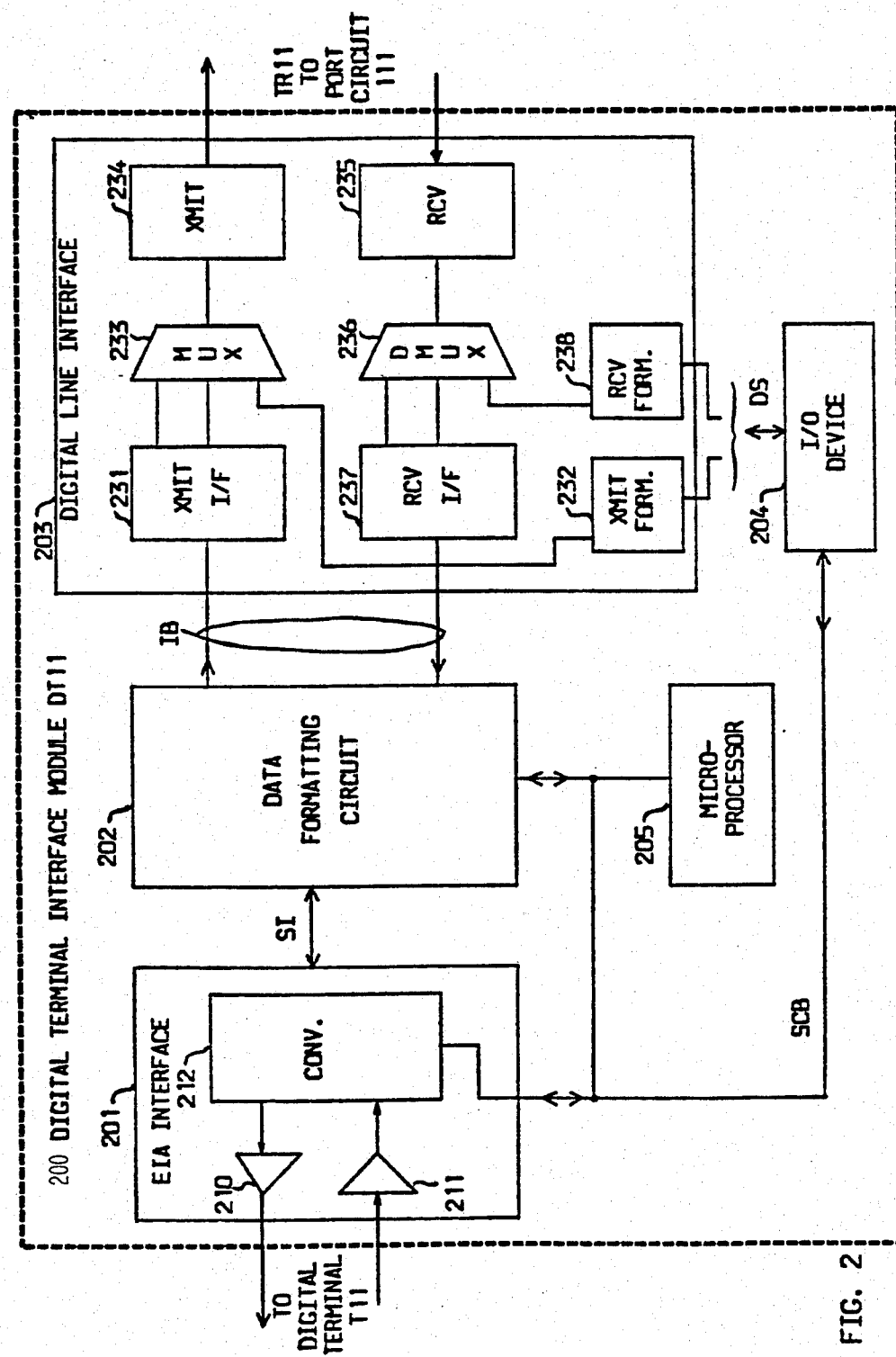
FIG. 2 illustrates the digital terminal interface module.

The interfacing of a digital terminal keyboard device (e.g. T11) with its associated port circuit (111) is accomplished by an associated digital terminal interface module (DT11) as shown in FIG. 2, element 200. This device also enables the digital terminal to be located remotely from the telephone switching system.

The standard digital terminal keyboard has an RS232 signal output which has a very limited transmission range. A digital terminal interface module is used to convert the RS232 signals to alternate bipolar modulated code signals which can be transmitted a significant distance over a communication pair to the telephone switching system. The digital terminal interface module is either an integral part of the digital terminal (the situation assumed for this disclosure) or connected between the existing digital terminal and the associated communication pair.

MESSAGE FORMAT—FIG. 5

A particular message frame format is used by DTIM DT11 200 to enable data transmission between port circuits such as 111 and their associated digital terminals such as T11. This same message frame is also used by digital telephone station set T18 to transmit data to port circuit 118. This format consists of a framing bit and three fields: an S field that conveys control signalling data, and two I fields that convey information data (FIG. 5). This is a well-known data transmission format as described in the article by N. Accarino et al entitled, "Frame-Mode Customer Access to Local Integrated Voice and Data Digital Networks" published in 1979 in the Conference Report of the IEEE 1979 International Conference on Communications. In this data transmission format, one of the I fields can be used for the transmission of PCM-encoded voice information while the other one (or both I fields) can be used for the transmission of either bulk or interactive data.

Digital Terminal Interface Module—FIG. 2

Digital terminal interface module DT11 200 (illustrated in FIG. 2) is a microprocessor-controlled circuit which contains a number of interface and protocol conversion devices. Digital terminal T11 generates EIA control signals, ASCII data and timing signals that are converted by EIA interface circuit 201 from RS232 signal levels to 5 volt logic signal levels. EIA interface 201 interconnects with digital terminal T11 to process EIA control, data and timing signals. EIA interface 201 includes line driver 210 and line receiver 211 to handle the transmit and receive functions over the signal leads which connect DTIM DT11 200 with digital terminal T11. Converter 212 provides the control and data storage functions. In particular, converter 212 includes status registers (not shown) to store an indication of the state of the various EIA control leads from digital terminal T11. Converter 212 also includes a FIFO (not shown) which stores serial data bits transmitted by digital terminal T11 to EIA interface 201. When the FIFO in converter 212 contains eight bits, converter 212 sets a message-received flag in a message-received status register.

Microprocessor 205 periodically scans all the status registers in EIA interface 201 via bus SCB to determine whether there are any changes in the status of digital terminal T11. When a status register indicates a change in the state of an EIA control lead, microprocessor 205 reads the changed state out of the status register and generates a control message for system processor 100. Microprocessor 205 writes this control message via bus SCB into I/O device 204 which is an Intel 8243 I/O latch circuit. Similarly, when microprocessor 205 detects a set message-received flag during a scan, it signals EIA interface 201 to output the received eight bit data message in parallel over leads SI to data formatting circuit 202.

Data formatting circuit 202 generates idle flags when no data is being received from digital terminal T11. These idle flags are periodically read by digital line interface 203 and transmitted to switching network 101 via the I channel (port circuit 111, port data/control interface circuit 171). However, once digital terminal T11 begins transmitting a data message, data formatting circuit 202 formats the received data message. This formatting includes generating a header for the data message, bit stuffing and calculating a cyclic redundancy check (CRC) code which is appended to the end of the data message. The formatted data message is stored in eight bit increments in a data message memory (not shown) in data formatting circuit 202.

Digital line interface 203 interconnects DTIM DT11 200 with port circuit 111 via communication leads TR11. Digital line interface 203 includes a control circuit (not shown) and a phase-locked loop (not shown) which recover the clock signals from the message frames serially transmitted by port circuit 111 to DTIM DT11 200 via communication leads TR11. These recovered clock signals are used by digital line interface 203 to both receive message frames from port circuit 111 and generate message frames for serial transmission to port circuit 111.

Transmit interface 231 reads out eight bits at a time of the formatted data message stored in the data message memory of data formatting circuit 202. Similarly, transmit formatter 232 reads one bit at a time of the control message stored by microprocessor 205 in I/O device 204. Multiplexer 233 combines two eight bit data messages from transmit interface 231 with the one bit control message from transmit formatter 232 to create the message frame of FIG. 5. The resultant message frame is transmitted in serial form by transmitter 234 to port circuit 111 via communication leads TR11.

Message frames transmitted to DTIM DT11 200 by port circuit 111 are received and decoded in reciprocal fashion by DTIM DT11 200. Receiver 235 receives message frames serially transmitted by port circuit 111 on communication leads TR11. Demultiplexor 236 takes the received message frames from receiver 235 and switches the two eight-bit data messages to receive interface 237 and the one bit control message to receive formatter 238. Receive formatter 238 stores the control bit in I/O device 204 via lead DS. Microprocessor 205 reads the received control message from I/O device 204 in eight bit increments and interprets the same. If the control message requires that digital terminal T11 be signalled, microprocessor 205 loads the corresponding status registers in EIA interface 201 so that these signals will be forwarded to digital terminal T11. Similarly, data formatter 202 reads the two eight-bit data messages from receive interface 237 and transmits the same to digital terminal T11 via EIA interface 201. Data formatter 202 calculates a CRC code on the received data message to insure accuracy of transmission.

Data Call Transfer Preindication

To illustrate the operation of data call transfer preindication in this system, assume that a calling party at digital telephone station set T18 wishes to initiate a data call to communications circuit T58 (which is assumed to be a data module such as a computer port set to automatic answer). When the data call is established, the calling party at telephone station set T18 then transfers the data call to a digital terminal device T11 which is located remotely from telephone station set T18.

In particular, the calling party at telephone station set T18 goes off-hook and telephone station set T18 transmits a control message to system processor 100 via the S channel (port circuit 118, port data/control interface circuit 171, I/O BUS) requesting dial tone.

Off-Hook Control Message

The above-mentioned "off-hook" control message is transmitted by port circuit 118, when scanned as described above, to port data control interface circuit 171, via leads P18. Port data/control interface circuit 171, in turn, relays this off-hook control message via I/O BUS to system processor 100 which assigns an idle digit register circuit to be connected to the port circuit (118) requesting service. System processor 100 allocates a network time slot in switching network 101 to accomplish this interconnection by transmitting network control signals to switching network 101 via lead SP. Switching network 101 responds to these network control signals by writing into a memory map (not shown) the correspondence between the allocated network time slot and the memory locations which are assigned respectively to telephone station set T18 and a digit register circuit (not shown).

The digit register circuit provides a PCM encoded dial tone over the I channel (already described) in response to the off-hook signal received. Having received the dial tone thus issued, the calling party at telephone station set T18 may dial a station number or may reserve a digital terminal first, then dial.

Figure 3:
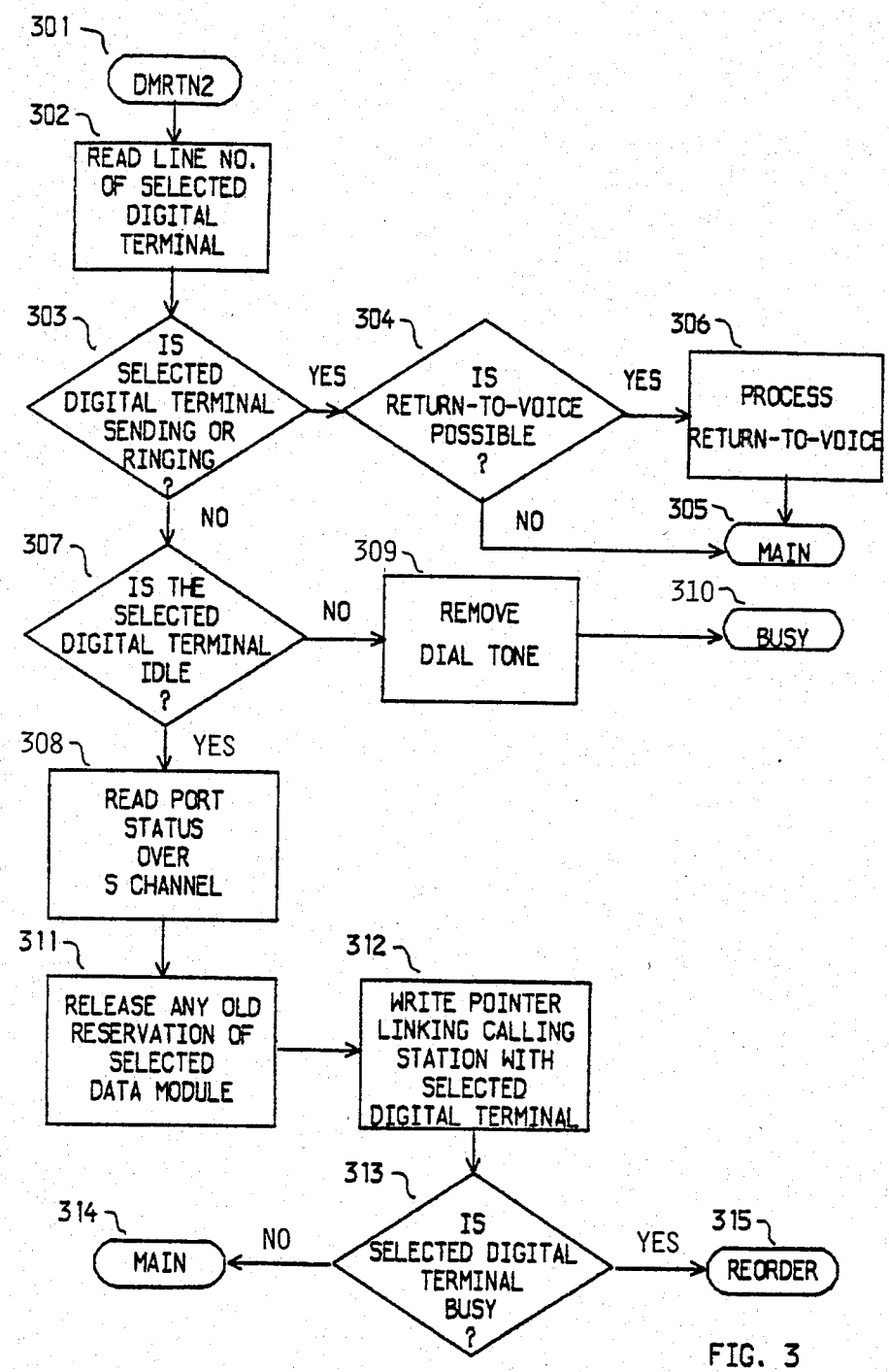
FIGS. 3-4 illustrate the method used for data call transfer preindication.

Assume that the calling party presses the DATA button on telephone station set T18 associated with selected digital terminal device T11 during dial tone. FIG. 3 illustrates the operation of the subject telephone switching system in response to this event. At step 302, system processor 100 reads the line number of the digital terminal device (T11) selected by the DATA button from a table maintained for that purpose. At step 303, system processor 100 determines whether or not digital terminal device T11 is sending or ringing. Digital terminal device T11 is designated as active if it is sending or ringing and cannot be reserved for data call transfer, steps 304, 305 and 306. If digital terminal device T11 is available, system processor 100 receives digital terminal device T11 for data call transfer.

System processor 100 determines at decision 307 whether the line at selected digital terminal device T11 is idle. If not, system processor 100 removes the dial tone at step 309 and exits to a conventional busy routine via terminal 310. (At this point, the caller receives a busy signal.) Since the line at selected digital terminal device T11 is idle in the given example, system processor 100 reads the status registers in port circuit 118 via the S channel, step 308.

Process Preindication Request

When a call is broken down by conventional call processing, data reservations are ignored. So old reservations for the digital terminal indicated by the DATA button pressed must be cleared before new reservations are made. To do this, step 311 follows pointers from register to register in system processor 100 clearing them as it goes.

System processor 100 at step 312 writes a pointer (DATA PTR) in its memory linking digital telephone station set T18 with the digital terminal (T11) indicated by the operated DATA button. A digital terminal reservation is thereby created and linked by the DATA PTR pointer to this data call. System processor 100 checks selected digital terminal device T11 at step 313 to determine its busy/idle status. If digital terminal T11 is busy, system processor 100 removes dial tone from digital telephone station set T18 and exits to a conventional reorder routine at step 315 to indicate that the terminal device reservation process is not successful. Selected digital terminal T11 is reserved in this example, system processor 100 uses the S channel to turn on the lamps in all DATA buttons on telephone station sets which buttons identify reserved digital terminal T11. System processor 100 exits the subroutine at step 314 to a digit collection subroutine. The caller proceeds to dial the number of the destination data module T58. The dial pulses or tones so generated are encoded into eight bit PCM samples by telephone station set T18 and transmitted through switching network 101 to the digit register circuit in the manner outlined above. When dialing is completed, system processor 100 reads out the dialed number from the digit register circuit via I/O BUS and decodes the dialed number to determine the destination of this call. In doing so, data module T58 is identified as the destination and system processor 100 signals data module T58 by activating port circuit 158 with a ringing control message transmitted via I/O BUS and port data/control interface circuit 175. Port circuit 158 responds to the ringing control message by applying an alterting signal to data module T58 via communication leads TR58.

Transfer After Called Party Answers

In the present example, data module T58 automatically goes off-hook in response to the alerting signal. System processor 100 signals switching network 101 to substitute data module T58 for the digit register circuit on this communication connection. Data module T58 is thereby connected to telephone station set T18 via the switching network time slot assigned to this communication connection by system processor 100.

When these circuit interactions are completed, telephone station set T18 and data module T58 are connected. At this point, to effect a transfer from telephone station set T18 (used to initiate the call) to digital terminal device T11, the calling party will press the DATA button on telephone station set T18 that corresponds to the subject digital terminal device T11. The resulting stimulus is sent over the S channel, already described, to system processor 100 where it is used as follows.

Routine DMRTN4

Figure 4:
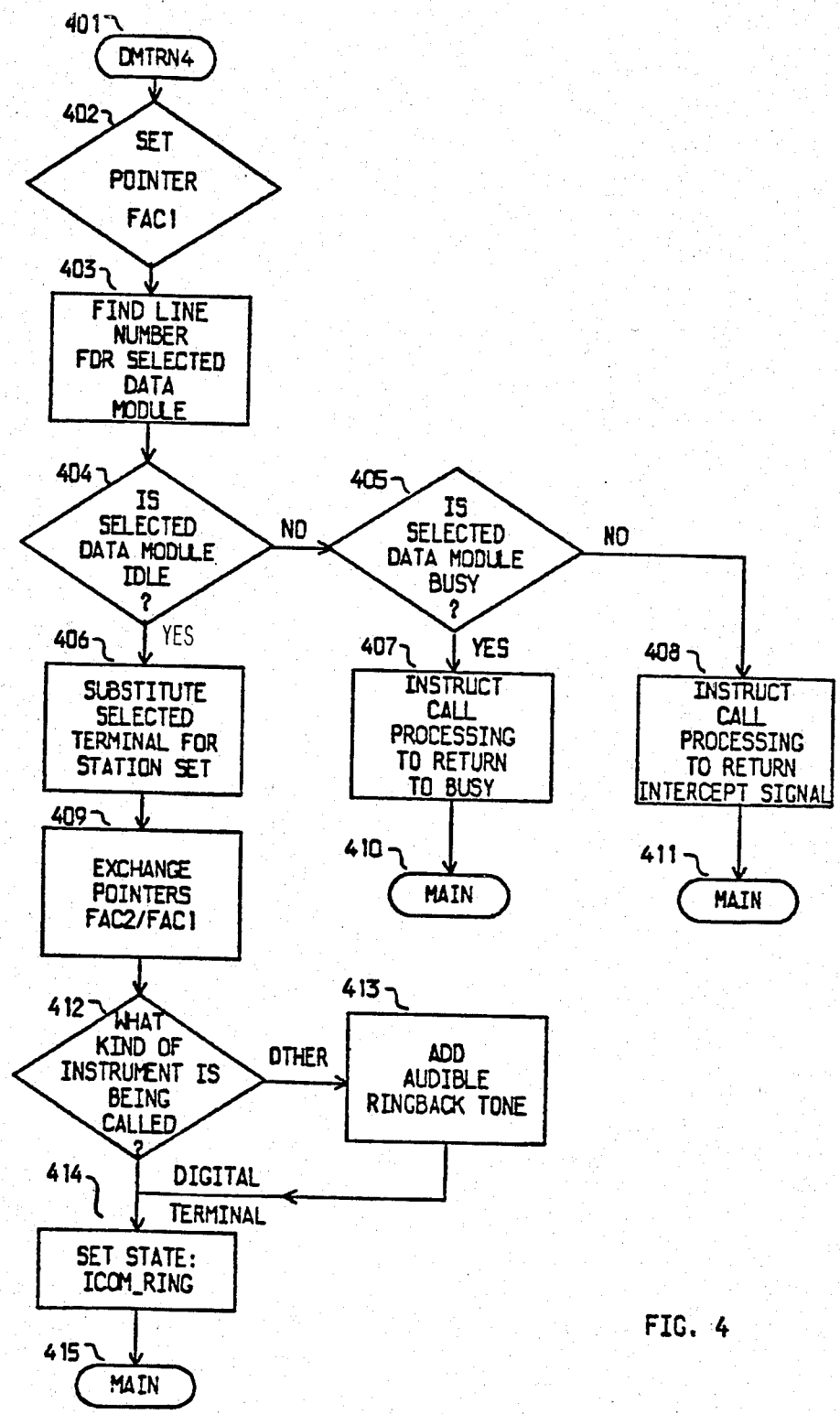

System processor 100 enters routine DMRTN4 at step 401 (shown in FIG. 4) in response to the DATA button control message. System processor 100 associates the line number of the line that sent the DATA stimulus, that of telephone station set T18, with pointer FAC1 at step 402.

System processor 100 at step 403 finds the line number (in a table maintained for the purpose) of the digital terminal (T11) that corresponds to the operated DATA button. System processor 100 determines at step 404 whether the line for selected digital terminal T11 is idle. If the line for digital terminal T11 is busy, step 405, a busy signal is returned to the calling party at telephone station set T18, step 407, and the call exits to conventional call processing at step 410. If the line for digital terminal T11 is otherwise unavailable, an intercept signal is returned to the calling party at telephone station set T18, step 408, and the call exits to conventional call processing at step 411. In the given example, the line for selected digital terminal T11 is idle so system processor 100 proceeds to step 406 and substitutes for telephone station set T18, the selected digital terminal T11 on the active call appearance. Thus telephone station set T18 is disconnected from the call and the digital terminal T11 is connected. Telephone station set T18, being disconnected, receives a dial tone at this point. But digital terminal T11 is still "on hook," so it must be stimulated in the conventional way to answer.

Conventional call processing treats the line associated with pointer FAC2 as the called station and, since it is on hook, will ring or otherwise stimulate the line to be answered. But the subject digital terminal T11 has been set to be associated with FAC1 as a result of step 402. Step 409, therefore, exchanges pointers so that the line assigned to digital terminal T11 is associated with pointer FAC2 and the line assigned to data module T58 is associated with pointer FAC1.

At step 412, system processor 100 retrieves from a table maintained for the purpose data that indicate what kind of instrument was called. On some occasions, the instrument may be other than a digital terminal: for instance a telephone station set. In these cases, an audible ringback tone is returned at step 413 to indicate that the subject line is being rung. But the instrument called in the current example is a data module, so step 413 is bypassed at step 412 and ringback is not sent. Finally, system processor 100, at step 414, sets state ICOM_RING to be used by ordinary call processing to complete the call in the conventional way, step 415.

While a specific embodiment of the invention has been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangement may be devised by those skilled in the art without departing from the spirit and the scope of the invention.

What is claimed is:

1. In a switching system which serves a plurality of communications circuits (T11-T58) each of which is connected by an associated port circuit (111-158) to a switching network (101) of said switching system, which switching network (101) establishes network connections among said communications circuits (T11-T58) by interconnecting said associated port circuits (111-158), wherein one or more of said communications circuits (T18, T51) are telephone station sets, each of which has associated therewith one or more of said communications circuits which are digital terminals (T11), said association including one or more designated buttons on said telephone station set (T18) corresponding to each of said digital terminals (T11) associated with said telephone station set (T18), a data call preindication method comprising the step of:

scanning said telephone station sets (T18, T51) for an operation of one of said designated buttons on any one of said telephone station sets (T18) in response to the initiation of a call at said telephone station set (T18); and reserving in response to the operation of one of said designated buttons on said telephone station set (T18), the one of said digital terminals (T11) associated with said operated designated button.

2. The method of claim 1 including the step of:
establishing, in response to dialing signals output by said telephone station set (T18), a network connection between said telephone station set (T18) and the destination (T58) indicated by said dialing signals.

3. The method of claim 2 including the step of:
substituting in response to a second operation of said operated designated button on said telephone station set (T18) said reserved digital terminal (T11) for said telephone station set (T18) on said network connection.

4. The method of claim 3 wherein the step of substituting includes the step of:
returning said telephone station set (T18) to an idle condition.

5. In a switching system which serves a plurality of communications circuits (T11-T58) each of which is connected by an associated port circuit (111-158) to a switching network (101) of said switching system, which switching network (101) establishes network connections among said communications circuits (T11-T58) by interconnecting said associated port circuits (111-158), wherein one or more of said communications circuits (T18, T51) are telephone station sets, each of which has associated therewith one or more of said communications circuits which are digital terminals (T11, T58), said association including one or more designated buttons on said telephone station set (T18) corresponding to each of said digital terminals (T11) associated with said telephone station set (T18), a data call preindication arrangement comprising:
one or more designated button means on each of said telephone station sets (T18) wherein each of said designated button means correspond to one of said associated digital terminals (T11);
system processor means (100) connected to said port circuits (111-158);
control signalling means (S channel) connected to and interconnecting said telephone station set (T18) and said system processor (100) and responsive to an operation of one of said designated buttons on said telephone station set (T18) for transmitting a facilities reservation signal to said system processor; and
means in said system processor means (100) responsive to said facilities reservation signal for reserving said digital terminal (T11) associated with said operated designated button means.

6. The data call preindication apparatus of claim 5 including:
means in said system processor means (100) responsive to dialing signals output by said telephone station set (T18) subsequent to the operation of said designated button for activating said switching network (101) to establish a network connection between said telephone station set (T18) and the destination indicated (T58) by said dialing signals.

7. The data call preindication apparatus of claim 6 including:
wherin said control signalling means (S channel) is responsive to a second operation of said designated button means on said telephone station set (T18) for transmitting a call transfer signal to said system processor means (100) indicative of the second operation of said designated button means; and
means in said system processor means (100) responsive to said call transfer signal for activating said switching network (101) to substitute said digital terminal (T11) associated with said operated designated button means for said telephone station set (T18) on said network connection.

* * * * *